(12) United States Patent
Kolodner et al.

(10) Patent No.: US 9,262,431 B2
(45) Date of Patent: Feb. 16, 2016

(54) EFFICIENT DATA DEDUPLICATION IN A DATA STORAGE NETWORK

(71) Applicant: International Business Machines Corporation, Armonk, NY (US)

(72) Inventors: Elliot K Kolodner, Haifa (IL); Eran Rom, Tel-Aviv (IL); Dmitry Sotnikov, Givataim (IL); Gil Vernik, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/970,629

(22) Filed: Aug. 20, 2013

(65) Prior Publication Data

US 2015/0058301 A1    Feb. 26, 2015

(51) Int. Cl.
*G06F 17/30* (2006.01)

(52) U.S. Cl.
CPC ............................. *G06F 17/30156* (2013.01)

(58) Field of Classification Search
CPC combination set(s) only.
See application file for complete search history.

(56) References Cited

U.S. PATENT DOCUMENTS

| | | | |
|---|---|---|---|
| 7,672,981 B1 * | 3/2010 | Faibish et al. | 707/999.204 |
| 8,108,353 B2 | 1/2012 | Balachandran et al. | |
| 8,204,868 B1 * | 6/2012 | Wu et al. | 707/693 |
| 8,250,325 B2 | 8/2012 | Holdman et al. | |
| 8,280,859 B2 | 10/2012 | Anglin et al. | |
| 2010/0088296 A1 | 4/2010 | Periyagaram et al. | |
| 2010/0094817 A1 * | 4/2010 | Ben-Shaul et al. | 707/697 |
| 2012/0257626 A1 | 10/2012 | McGhee et al. | |

FOREIGN PATENT DOCUMENTS

WO    2010/045262    4/2010

OTHER PUBLICATIONS

Xu et al., "Leakage-Resilient Client-Side Deduplication of Encrypted Data in Cloud Storage", Cryptology ePrint Archive: Report 2011/538, 2011. Can be found at : http://eprint.iacr.org/2011/538.pdf.
Lillibridge et al., "Sparse Indexing: Large Scale, Inline Deduplication Using Sampling and Locality", FAST '09 Proccedings of the 7th conference on File and storage technologies, pp. 111-123 , 2009.

* cited by examiner

*Primary Examiner* — Etienne Leroux
(74) *Attorney, Agent, or Firm* — Eyal Gilboa; Steven F. McDaniel

(57) ABSTRACT

Machines, systems and methods of uploading data files, the method comprising a first client machine dividing a first file into N data chunks to be uploaded to a server, wherein the N data chunks are of size kX, where k is an integer and X is size of a minimal size data chunk, wherein X is known by the server and by at least a second client machine used for uploading a second file to the server in data chunks of size k'X; and uploading the first file to the server, wherein a first unique signature is calculated for the first file based on applying a signature function to a collection of signatures calculated for the minimal size data chunks of size X that make up the data chunks of size kX in the first file, wherein the uploading of the first file is accomplished by uploading the data chunks of size kX to the server in any order.

14 Claims, 5 Drawing Sheets

EFFICIENT DATA DEDUPLICATION IN A DATA STORAGE NETWORK

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to data deduplication and, more particularly, to file deduplication in a data storage network.

BACKGROUND

Data deduplication is a data management technique for eliminating the need for storing duplicate copies of data stored on a data storage medium. Data deduplication involves scanning data units (e.g., data chunks) on a target storage medium, identifying a data chunk with duplicate copies, maintaining a single copy of the data chunk and eliminating the duplicate copies by replacing the duplicate copies with a reference (i.e., a pointer) to the first data chunk. Data deduplication can be performed at the file level in a similar manner as done at the chunk level. Data file deduplication involves calculating a signature for a target data file based on the content of the data file, detecting duplicate copies of the target data file by comparing the signature of the target data file with other files, and deduplicating the duplicate copies.

In a distributed storage system, a data file may be uploaded from a client machine to a storage server. Typically, the client machine first breaks down the large data file into multiple data chunks and then uploads the multiple data chunks individually to the storage server over a network connection. Once the individual data chunks are received by the storage server, the data chunks have to be reconstructed to build the data file. In a rudimentary scenario, the file is reconstructed from the multiple data chunks in a first phase, and then a signature is calculated for the entire file in a second phase. A more efficient option would be to calculate the signatures for the multiple data chunks separately as the data chunks are received by the server and then calculate a signature for the file based on the collective signatures of the multiple data chunks.

The latter option works well in a data storage system in which deduplication is performed across the files uploaded by the same client machine that uses equal-size data chunks for the purpose of uploading all the files. However, in a data storage network where different client machines use different data chunk sizes to upload the files, the signature value calculated for two identical files may not be the same. This is because the size of the data chunk affects the signature value calculated for the data chunk. As such, the signature value for identical files calculated based on the collective signatures of multiple data chunks of different sizes will not be the same. In such a scenario, deduplication cannot be correctly performed, because a signature match will not be detected between two identical files that are uploaded in different-size data chunks.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods of uploading data files are provided. In one embodiment, the method comprises: a first client machine dividing a first file into N data chunks to be uploaded to a server, wherein the N data chunks are of size kX, where k is an integer and X is size of a minimal size data chunk, wherein X is known by the server and by at least a second client machine used for uploading a second file to the server in data chunks of size k'X; and uploading the first file to the server, wherein a first unique signature is calculated for the first file based on applying a signature function to a collection of signatures calculated for the minimal size data chunks of size X that make up the data chunks of size kX in the first file, wherein the uploading of the first file is accomplished by uploading the data chunks of size kX to the server in any order.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
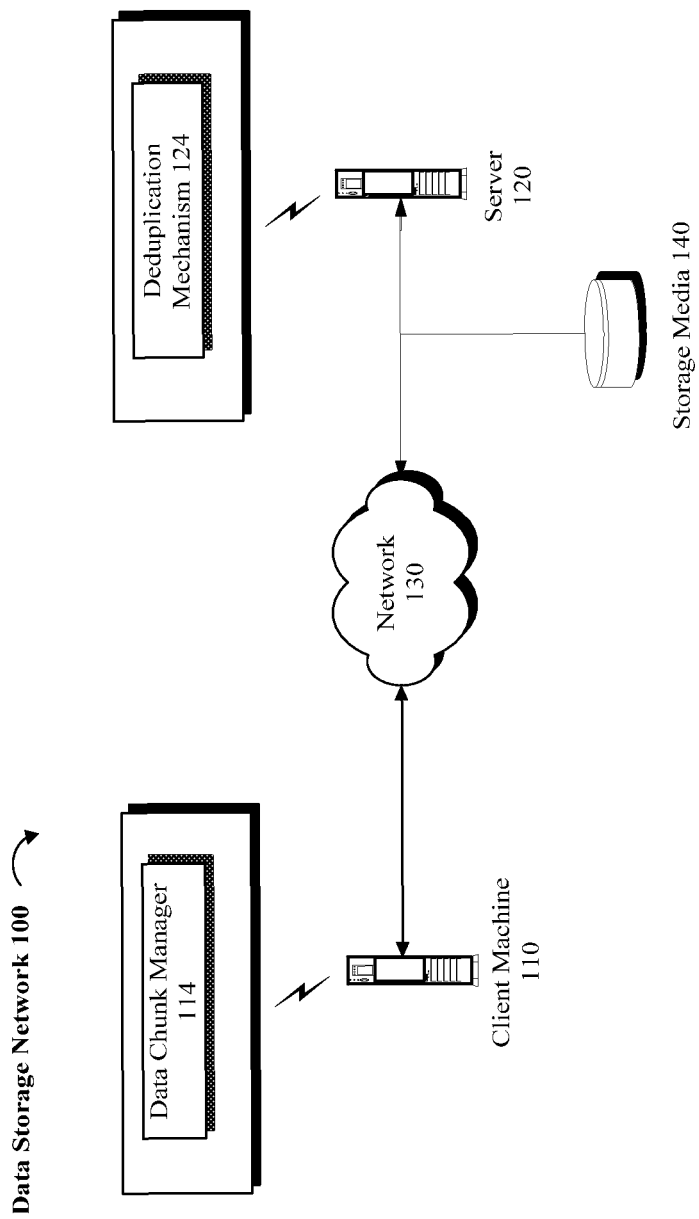
FIG. 1 illustrates a data storage network that supports data deduplication across a distributed system, in accordance with one or more embodiments.

Referring to FIG. 1, in accordance with one or more embodiments, a deduplication scheme in a data storage network 100 is provided by which a data file may be uploaded from a client machine 110 to a server 120 by way of uploading individual data chunks over a network 130. As provided in further detail below, once a unique signature is calculated for the data file, duplicate copies of the data file may be found based on the unique signature and may be ultimately deduplicated.

Figure 2:
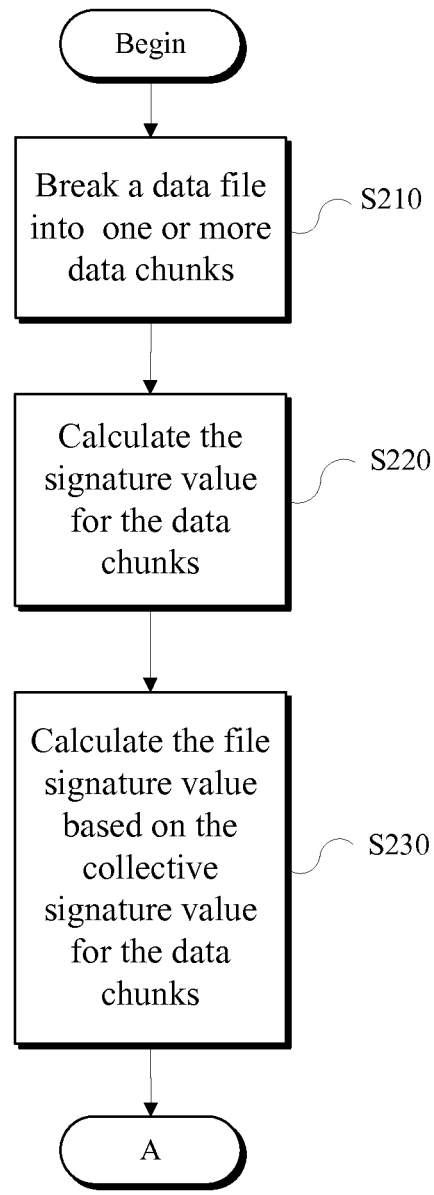
FIG. 2 is a flow diagram illustrating an exemplary method for calculating a signature value for a file that is uploaded from a client machine to a server, in accordance with one embodiment.

Referring to FIGS. 1 and 2, in an example embodiment, a data chunk manager 114 may be implemented over a client machine 110 to break up a data file into one or more data chunks, when the data file is to be uploaded to the server 120 (S210). The size of a data chunk may be equal to or a multiple of a certain minimal size (e.g., 1 MB). The minimal size is known by server 120, for the purpose of reconstructing the data file and may be determined and enforced by data chunk manger 114 pursuant to an upload or storage policy disseminated to client machines 110, and optionally to all client machines 110 that upload data to server 120.

As noted above, depending on implementation, data chunk manager 114 may divide a target data file into a plurality of minimal size data chunks or into a plurality of data chunks that are a multiple of the minimal size. For example, a 40 MB file may be divided into 40 one-MB data chunks, or 20 two-MB data chunks, or 10 four-MB data chunks, or alternatively into 10 two-MB data chunks and 20 one-MB data chunks, where the minimal data chunk is designated as 1 MB. The data chunk size may be determined based on preference or an algorithm taking into account the most optimum chunk size according to network conditions, available bandwidth, etc.

A plurality of signature values may be calculated for data chunks that makes up a target data file (S220), and a unique signature may be calculated for the subject data file based on the individual signatures calculated for the data chunks (S230). The signature value for a target data chunk may be calculated by applying a hash function to the minimal size data chunks that make up the target data chunk. A full file signature may be calculated by concatenating the hash values for the minimal size data chunks and applying a hash function to the concatenation to determine the full file hash signature.

Depending on implementation, the signature values, for the data chunks or the data file, may be calculated either before or after the data file is uploaded to server 120. In the latter scenario, the server 120 calculates the signatures for the minimal size data chunks uploaded, stores the signature values, concatenates the signature values together for the minimal data chunks, and calculates a signature for the concatenated version of the signatures. The result yields a unique signature for the entire data file which is then used by deduplication mechanism 124 for the purpose of deduplication.

Figure 3:
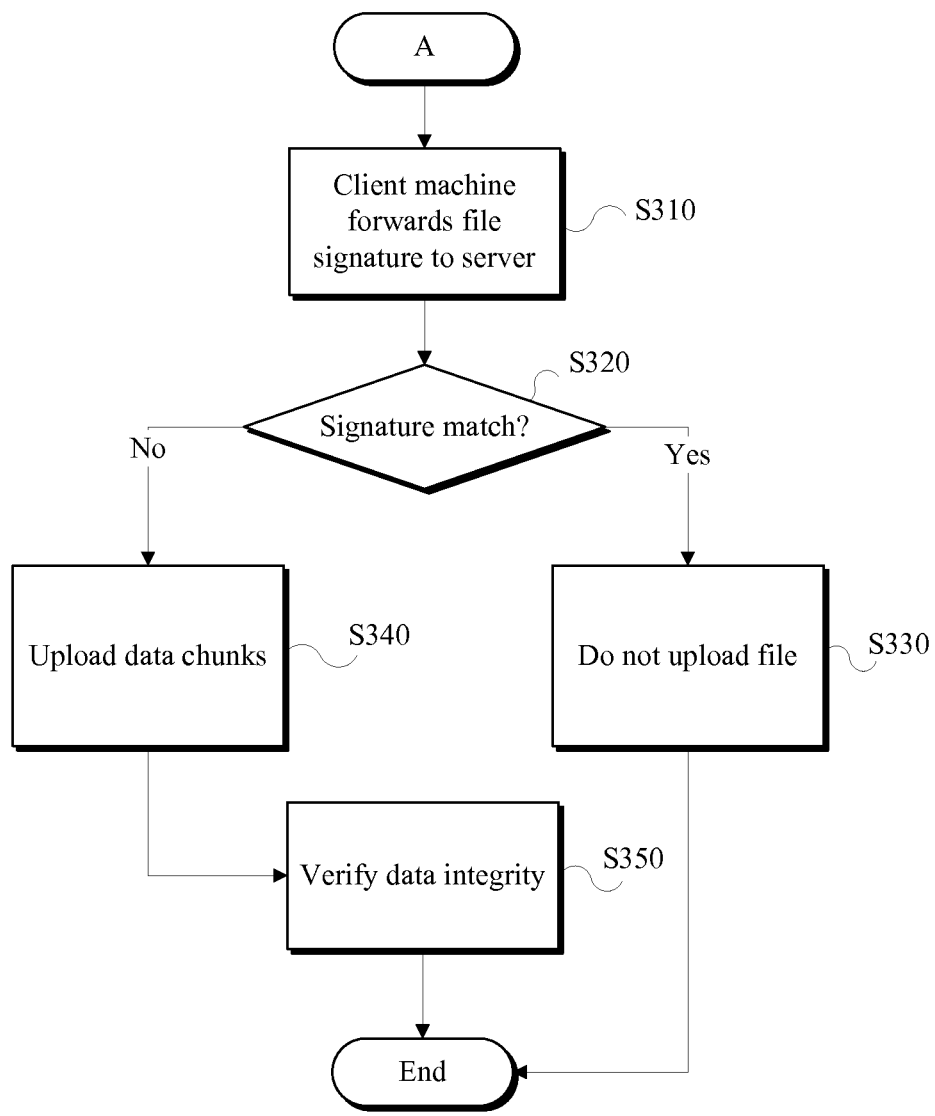
FIG. 3 is a flow diagram illustrating an exemplary method for deduplicating data, in accordance with one embodiment.

Referring to FIG. 3, in one implementation, client machine 110 calculates the unique signature value for a file that is to be uploaded (e.g., according to the minimal size data chunk signature calculation noted above) and forwards the signature value to server 120 prior to the file upload process being initiated (S310). Once the server 120 receives the file signature, the server 120 compares the file signature against a data structure (e.g., a lookup table, a database, a deduplication table, etc.) that includes a listing of unique file signatures associated with files already stored on server 120 (or storage media 140 connected server 120).

If a signature match is detected (S320), the file content is not uploaded to the server 120 (S330). However, the proper references (e.g., entries in a deduplication table or in an iNode file system) may be updated to reflect that the file was successfully uploaded. A pointer, for example, may be provide to a location on a data storage medium (e.g., storage media 140) where the same content is stored. In this manner, a so-called client-side deduplication may be performed, eliminating the overhead associated with first uploading a file to the server and then determining whether a duplicate copy exist on the server 120.

In an alternative embodiment, a so-called server-side deduplication scheme may be utilized, where the file content is uploaded to the server first, the signature of the file after upload is determined (e.g., according to the minimal size data chunk signature calculation noted above), and then the signature is compared to the records of a deduplication table, for example, to determine whether a duplicate copy exists based on a matching file signature. If so, then the proper deduplication records and file pointers are updated to indicate that the file was successfully uploaded. However, the uploaded content is discarded and is not stored on server 120.

Referring back to FIG. 3, if a match for the file signature is not found (S320), the data chunks associated with the file are uploaded to the server 120 (S340). In one implementation, the server 120 may calculate the signature value for an uploaded chunk and the full signature of the data file (e.g., based on the minimal size data chunks that make up each uploaded data chunk) and compare the one or more of said values to values passed from client machine 110 to verify data integrity (S350). That is, if the signature value for a data chunk or a data file, as calculated by server 120, does not match the corresponding signature value reported by the client machine 110, then server 120 may conclude that the data chunk or the data file was not completely uploaded.

In a simplified example, if we assume that a file is divided into N data chunks (e.g., where a data chunk is equal to or is a multiple of a predetermined minimal size data chunk), a hash tree may be used for the purpose of storing the hash values calculated for the N data chunks (e.g., based on hashes taken over the minimal size data chunks that makeup a data chunk$_{(i)}$ where "i" is 1 through N). The hash tree may be a Merkle tree in which every non-leaf node is labeled with the hash of the labels of its children nodes. Hash trees are generally useful for efficient and secure verification of large data structure contents. In one embodiment, the root of the hash tree includes the calculated full file signature for the data file, and the leaves of the tree include the hash values for the data chunks (or the minimal size data chunks).

One advantage of using a hash tree implementation is that the hash tree allows for the root of the tree which represents the signature value for the entire file to be stored in volatile memory of server 120, for example, to the exclusion of the leaves of the tree which represent the signature values for the minimal size data chunks that make up the file. As such, the signature values for the minimal size data chunks may be stored in non-volatile storage media (e.g., storage media 140) reducing the amount of data that is to be stored in memory for the purpose of calculating the signature value of the data file by a factor of N, resulting in significant savings in memory usage.

In the following, without limitation, a detailed example is provided in relations to the use of a hash function for calculating a file's unique signature. A hash function is an algorithm or subroutine that maps large data sets with variable lengths to smaller data sets of a fixed length. As noted earlier, a file A may be divided into N data chunks (e.g., $DC\_1$, $DC\_2$, $DC\_3$, ..., $DC\_n$). In this example, size of a data chunk may be a multiple of the minimal size data chunk. If the minimal data chunks is 3 MB, for example, then $DC\_1$ may be equal to 15 MB (a multiple of 5 of the minimal size data chunk) and $DC\_2$ may be equal to 30 MB (a multiple of 10 of the minimal size data chunk), for example.

As noted earlier, server 120 and client machines 110 in network 130 are aware of the size of the minimal size data chunk such that if the size of the minimal data chunk is X, the server 120 may treat data chunks of size X, 2X, 3X, ..., kX as multiples of the minimal size data chunk. In this manner, data chunks uploaded to the server 120 by different client machines 110 (whether in sizes X, 2X, 3X, ..., kX) are treated as multiple of the known minimal size data chunk for the purpose of calculating the hash values for the uploaded data chunks and ultimately the unique signature for the uploaded file.

In the above example, the client machine 110 may divide the data file A into N data chunks and upload the N data chunks to the server 120 via the network 130. The client machine 110 applies a hash function to the minimal size data chunks that make up data chunks 1 through N to obtain hash values for the minimal size data chunks and ultimately the uploaded data chunks and the uploaded file as a whole, based on a concatenation of hash values for the minimal size data chunks (and data chunks 1 through N) and apply a hash function to calculate the full file hash signature. The full file hash signature may be the signature used to uniquely identify file A.

As noted earlier, a hash process may be used by server 120 to calculate signature values for the uploaded data chunks and ultimately a signature value for the uploaded file (e.g., based on hash values for the minimal size data chunks), for the purposes of integrity verification and deduplication. It is noteworthy that, in the above example, if a second file B is uploaded by the same client machine 110 or another client machine in network 130, if file B is identical to file A, the signature calculated for file B would be the same as that calculated for file A, provided that file B is also divided into the same number of minimal size data chunks, that are of the same minimal size, subject to the same hash functions.

As such, client machines 110 that upload the files and the server system 120 that processes the uploaded files may be configured to divide and process data chunks in a file according to a protocol that supports a policy that a data chunk that makes up the file is to be equal to or to be a multiple of a minimal data chunk size that is known by the participating client machines that upload data to the server system 120. Advantageously, when the data chunks are uploaded to the server, the hash function for calculating the file signature may be uniformly applied to the minimal size data chunks that make up the file data chunks to determine the same signature for the same files that may be uploaded by different client machines 110.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
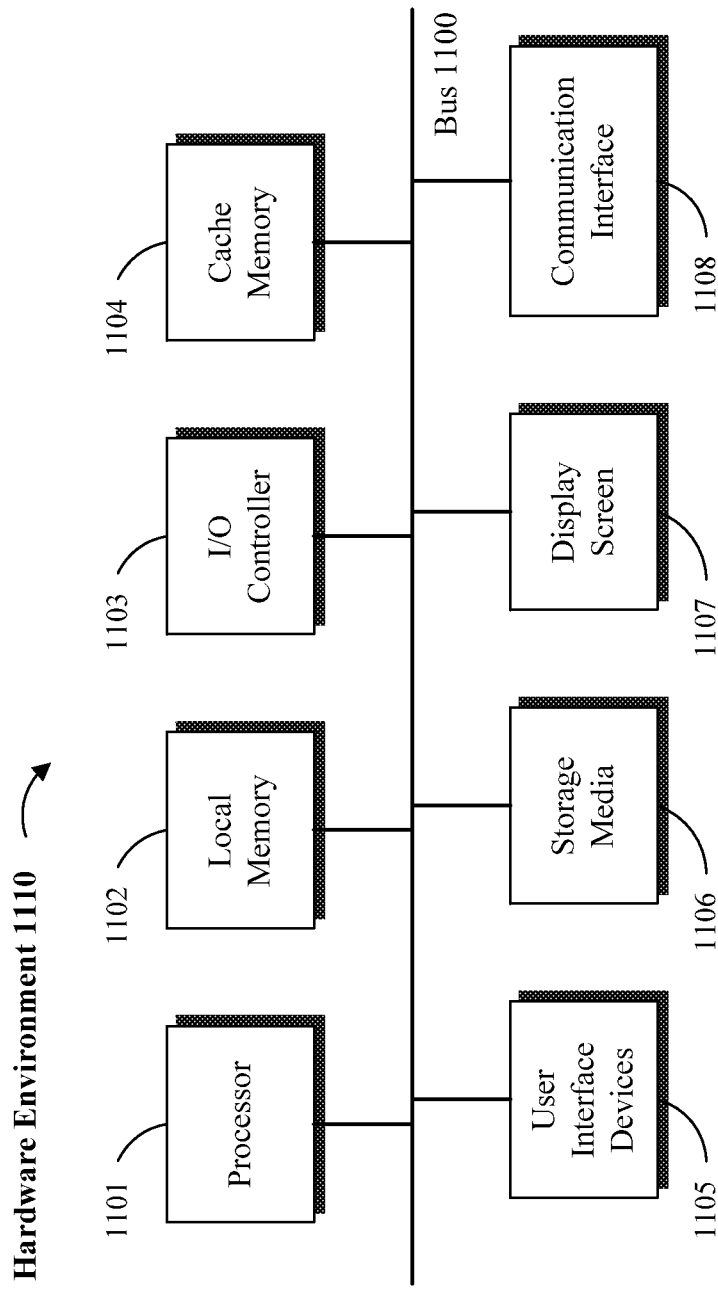
FIGS. 4A and 4B are block diagrams of hardware and software environments in which the disclosed systems and methods may operate, in accordance with one or more embodiments.
Figure 4B:
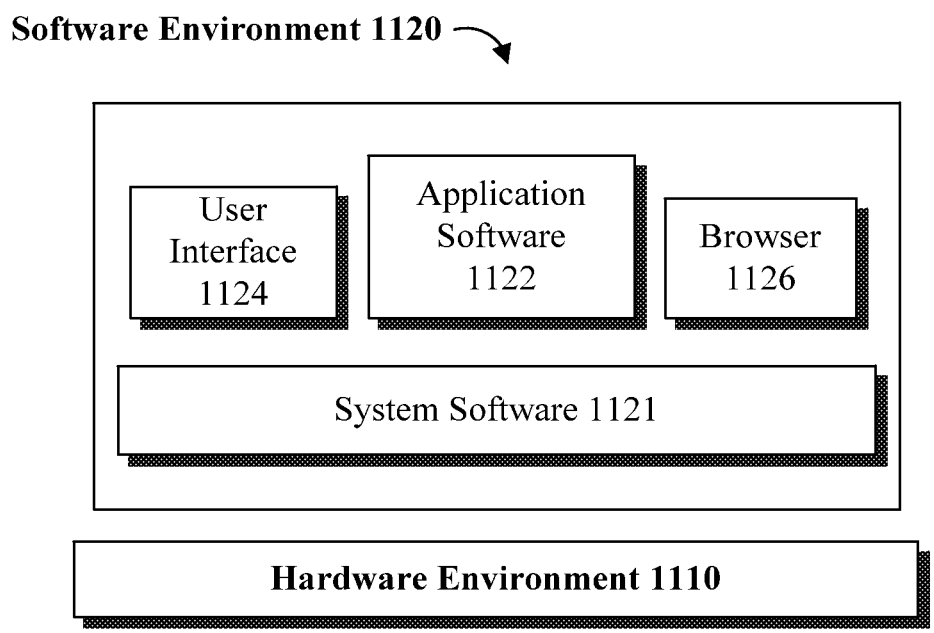

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipment that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method of uploading data files, the method comprising:
   a first client machine dividing a first file into N data chunks to be uploaded to a server, wherein the N data chunks are of size kX, where k is an integer and X is size of a minimal size data chunk, wherein X is known by the server and by at least a second client machine used for uploading a second file to the server in data chunks of size k'X, where k' is not equal to k;
   uploading the first file to the server, wherein a first file signature is calculated for the first file based on applying a signature function to a collection of first chunk signatures calculated for the minimal size data chunks of size X that make up the data chunks of size kX in the first file;
   comparing the first file signature calculated for the first file with a second file signature calculated for the second file by applying the same signature function to a collection of second chunk signatures calculated for the minimal size data chunks of size X that make up the data chunks of size k'X in the second file; and
   deduplicating the first file, in response to determining that the first file signature and the second file signature are a match.

2. The method of claim 1 wherein the deduplicating is performed by discontinuing uploading of the second file to the server.

3. The method of claim 1 wherein the deduplicating is performed after uploading the second file to the server by removing the uploaded copy of the second file from the server.

4. The method of claim 1 wherein a signature for a target minimal size data chunk, that makes up a data chunk, is calculated by applying a hash algorithm to content of the minimal size data chunk.

5. The method of claim 1 wherein the signature function applied to the collection of chunk signatures calculated for the minimal size data chunks that make up the fixed size data chunks is a hash function.

6. The method of claim 1 wherein the first file signature for the first file is calculated by the first client machine and provided to the server.

7. The method of claim 1 wherein the first file signature for the first file is calculated by the server.

8. The method of claim 1 wherein the collection of chunk signatures calculated for the minimal size data chunks are calculated by the server as a minimal size data chunk completes uploading to the server.

9. A system comprising:
   a logic unit for dividing a first file into N data chunks to be uploaded to a server, wherein the N data chunks are of size kX, where k is an integer and X is size of a minimal size data chunk, wherein X is known by the server and by at least a second client machine used for uploading a second file to the server in data chunks of size k'X, where k' is not equal to k; and
   a logic unit for uploading the first file to the server, wherein a first file signature is calculated for the first file based on applying a signature function to a collection of chunk signatures calculated for the minimal size data chunks of size X that make up the data chunks of size kX in the first file;
   a logic unit for comparing the first file signature calculated for the first file with a second file signature calculated for the second file by applying the same signature function to a collection of second chunk signatures calculated for the minimal size data chunks of size X that make up the data chunks of size k'X in the second file; and a logic unit for deduplicating the first file, in response to determining that the first file signature and the second file signature are a match.

10. The system of claim 9 wherein the deduplicating is performed by discontinuing uploading of the second file to the server.

11. The system of claim 9 wherein the deduplicating is performed after uploading the second file to the server by removing the uploaded copy of the second file from the server.

12. A computer program product comprising a computer readable storage medium having a computer readable program, wherein the computer readable program comprises instructions for:

dividing a first file into N data chunks to be uploaded to a server, wherein the N data chunks are of size kX, where k is an integer and X is size of a minimal size data chunk, wherein X is known by the server and by at least a second client machine used for uploading a second file to the server in data chunks of size k'X, where k' is not equal to k; and uploading the first file to the server, wherein a first file signature is calculated for the first file based on applying a signature function to a collection of chunk signatures calculated for the minimal size data chunks of size X that make up the data chunks of size kX in the first file;

comparing the first file signature calculated for the first file with a second file signature calculated for the second file by applying the same signature function to a collection of second chunk signatures calculated for the minimal size data chunks of size X that make up the data chunks of size k'X in the second file; and deduplicating the first file, in response to determining that the first file signature and the second file signature are a match.

13. The computer program product of claim 12 wherein the deduplicating is performed by discontinuing uploading of the second file to the server.

14. The computer program product of claim 12 wherein the deduplicating is performed after uploading the second file to the server by removing the uploaded copy of the second file from the server.

* * * * *